US 6,579,333 B2

(12) United States Patent
Huang

(10) Patent No.: US 6,579,333 B2
(45) Date of Patent: Jun. 17, 2003

(54) AIR PURIFIER WITH A ROTATABLE PLUG

(75) Inventor: Ping Huang, Tainan Hsien (TW)

(73) Assignee: Hung Hsin Electric Co., Ltd., Tainan Hsien (TW)

( * ) Notice: Subject to any disclaimer, the term of this patent is extended or adjusted under 35 U.S.C. 154(b) by 35 days.

(21) Appl. No.: 09/899,254

(22) Filed: Jul. 6, 2001

(65) Prior Publication Data

US 2003/0005668 A1 Jan. 9, 2003

(51) Int. Cl.[7] .............................................. B01D 35/30
(52) U.S. Cl. ........................ 55/385.1; 55/467; 55/471; 55/472; 55/473; 439/11; 439/13
(58) Field of Search .................. 55/385.1, 385.2, 55/467, 471, 472, 473; 439/1, 11, 13, 18, 19, 20, 21, 23, 28, 32

(56) References Cited

U.S. PATENT DOCUMENTS

| | | | | |
|---|---|---|---|---|
| 3,092,695 A | * | 6/1963 | Abrams | 439/11 |
| D271,042 S | * | 10/1983 | Giannola | D23/366 |
| 5,352,122 A | * | 10/1994 | Speyer et al. | 439/13 |
| D357,330 S | * | 4/1995 | Wong et al. | D23/328 |
| 5,683,254 A | * | 11/1997 | Lin | 439/11 |
| 5,735,918 A | * | 4/1998 | Barradas | 55/385.1 |
| D411,001 S | * | 6/1999 | Pinchuk | D23/364 |
| 5,954,519 A | * | 9/1999 | Hsiao | 439/21 |
| 6,093,028 A | * | 7/2000 | Yang | 439/11 |
| 6,328,791 B1 | * | 12/2001 | Pillion et al. | 55/471 |

* cited by examiner

Primary Examiner—Duane Smith
Assistant Examiner—Jason M. Greene
(74) Attorney, Agent, or Firm—Rosenberg, Klein & Lee

(57) ABSTRACT

An air purifier has a rotatable power plug capable to be inserted directly into a common socket and to be turned around to suit to different directions and positions of various sockets to increase facility in use. Besides, the body of the air purifier is provided with a bulb inside and a bulb switch on an upper side to turn on or turn off the bulb, thus also serving as a lamp lighting at night.

1 Claim, 4 Drawing Sheets

AIR PURIFIER WITH A ROTATABLE PLUG

BACKGROUND OF THE INVENTION

This invention relates to an air purifier, particularly to one of a small size, having a rotatable plug possible to be inserted directly into a common socket and to suit to any position of a socket, quite convenient in use.

The prosperity in industry and commerce has indeed made our lives more convenient and comfortable than ever before, but unfortunately it also has brought us problems of various environmental pollutions, especially air pollution. The air around us is full of ash with bacteria, exhaust from automobiles, toxic smoke and gas exhausted out of factories and the like, which affect our health a great deal.

So various types of air purifiers have been manufactured to improve air quality and ensure people's health. However, the air purifiers on markets nowadays all are of big sizes and require an additional conductive wire to connect with a socket, thus not only needing a large space for placing it, but also resulting in hindrance when people walk or move things around. Besides, the air purifiers commonly used today have only one function of filtering out air, not conforming to economical gain, nor having good competitive capability of products.

SUMMARY OF THE INVENTION

The main objective of this invention is to offer a small-sized air purifier with a rotatable plug capable to be inserted directly into a common socket. The air purifier in this invention has a body provided with two opposite conductors, with one end of each conductor formed into an L-shaped conductive portion to contact respectively with two plug copper strips of a power plug positioned outside the body of the air purifier so as to make electric connection and the power plug capable to rotate by 90 degrees. Thus, by turning around the power plug, its two copper strips will respectively contact with the L-shaped conductive portions regardless of the different positions and directions of the socket, surely convenient in use.

Another objective of this invention is to offer an air purifier having a chamber inside its body for receiving a bulb with a lampshade to cover up the chamber, and a lamp switch separated from the power switch controlling the lamp to let the air purifier used as a night lamp.

BRIEF DESCRIPTION OF THE DRAWINGS

This invention will be better understood by referring to the accompanying drawings, wherein.

DETAILED DESCRIPTION OF THE PREFERRED EMBODIMENT

Figure 1:
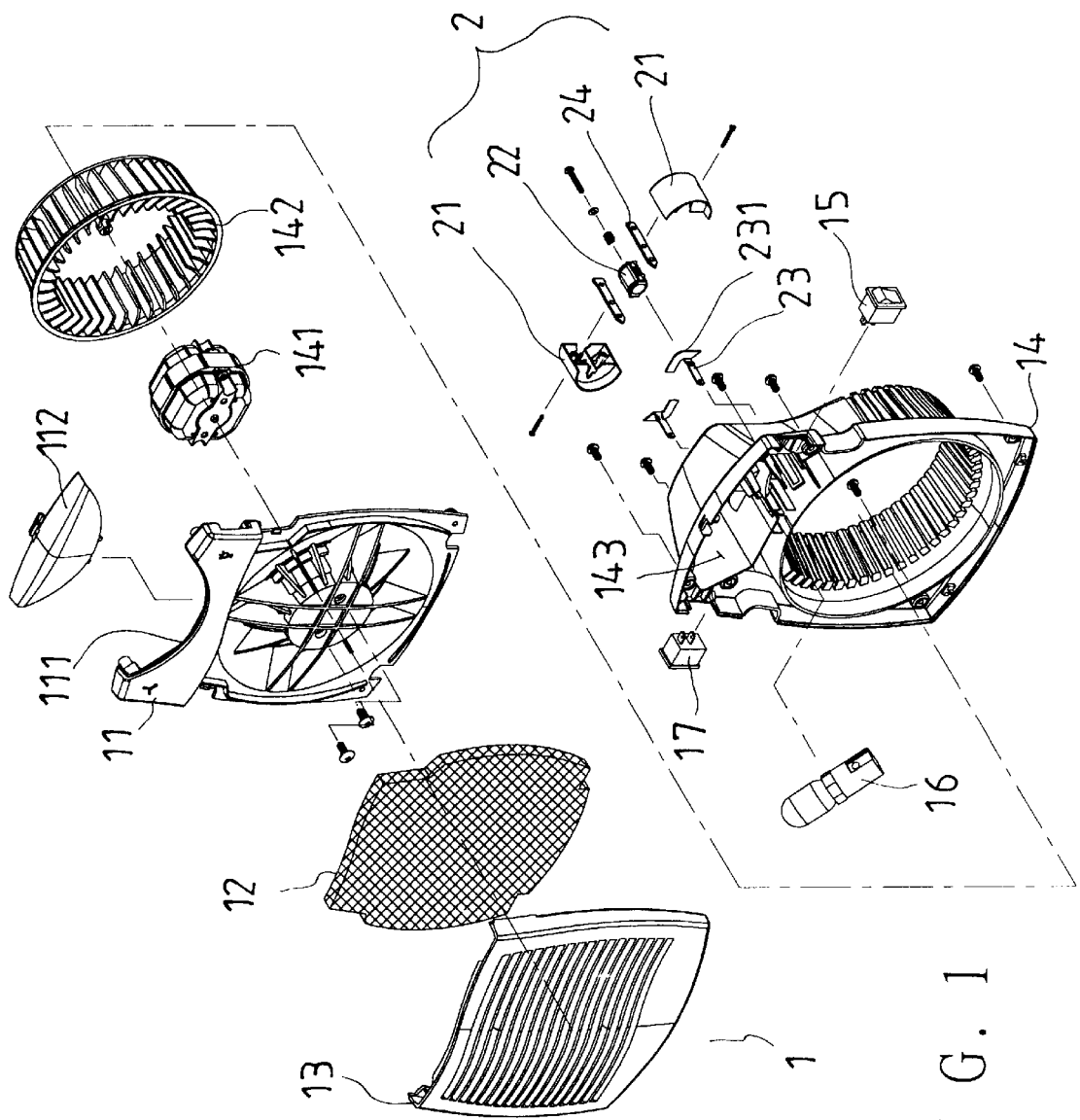
FIG. 1 is an exploded perspective view of an air purifier of the present invention.

A preferred embodiment of an air purifier in this invention, as shown in FIG. 1, includes a body 1 and a power plug 2 as main components combined together.

The body 1 similar to a conventional one in structure has a filter net 12 and a front net 13 orderly fixed on its front side and a rear casing 14 screwed stably at its rear side. The rear casing 14 is provided with a motor 141 and a fan 142 inside and a power switch 15 at an upper side to control the motor 141.

Different from the conventional one, the air purifier in this invention is provided with a chamber 143 on the rear casing 14 for receiving a bulb 16. A recessed portion 111 of the body member 11 matching with the chamber 143 of the rear casing 14 is formed on the body 1 and provided with a lamp shade 112 therein, and further a lamp switch 17 installed on the main body 1 to turn on or turn off the bulb 16.

Figure 2:
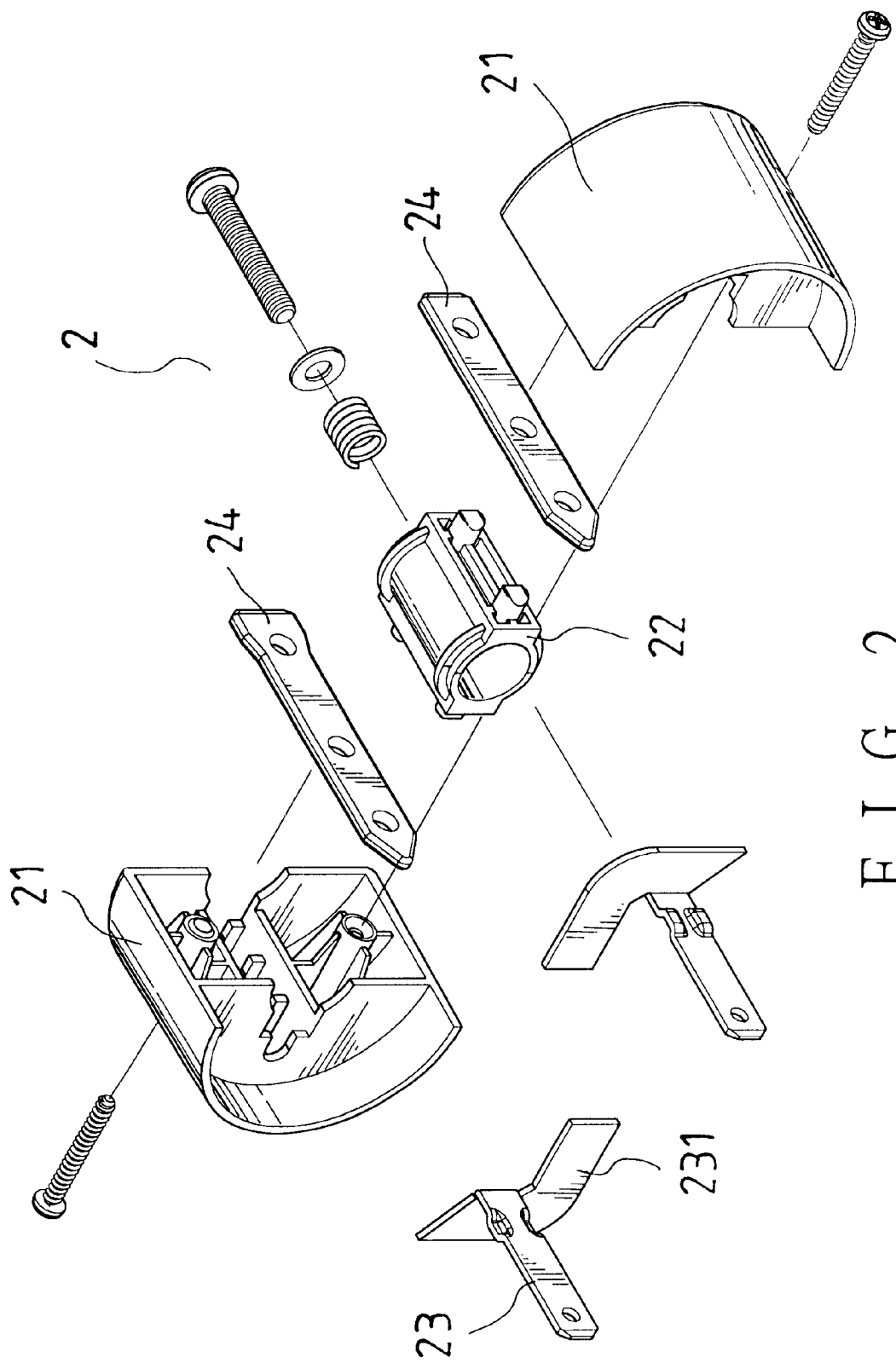
FIG. 2 is an exploded perspective view of a rotatable power plug of the air purifier of the present invention.
Figure 3:
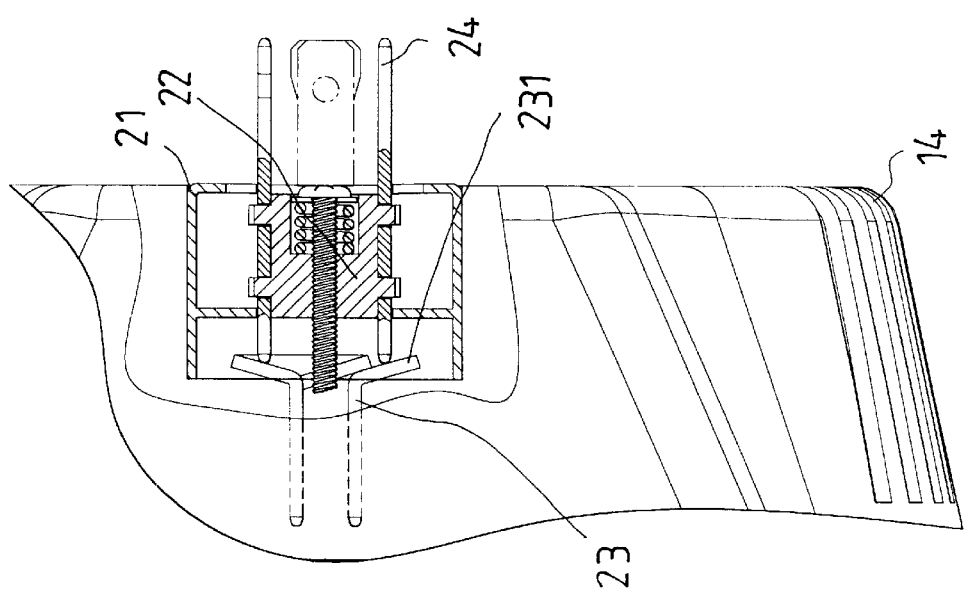
FIG. 3 is a side partial cross-sectional view of the air purifier of the present invention.

The power plug 2, referring to FIGS. 2 and 3, composed of two corresponding casings 21 is pivotally combined with the main body 1 by means of a plug fixing shaft 22, letting the power plug 2 rotate by 90 degrees in the body 1. The power plug 2 has two opposite conductors 23 secured at its rear side, with one end of each conductors 23 connected to the interior of the body 1 to control the motor 141 and the bulb 16 and with the other end formed into an L-shaped conductive portion 231. In addition, two plug copper strips 24 corresponding to the conductors 23 are fitted inside the plug casing 21, having one end of each plug copper strip 24 contact with the L-shaped conductive portions 231 of the conductors 23 and the other end protruding out of the plug casing 21.

Figure 5:
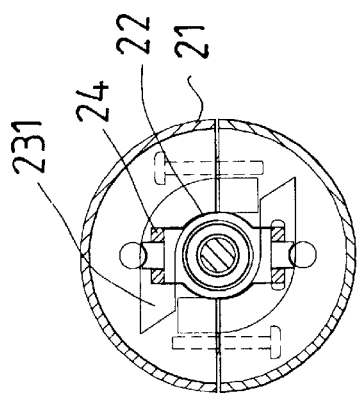
FIG. 5 is another rear cross-sectional view of the rotatable plug of the air purifier of the present invention.
Figure 4:
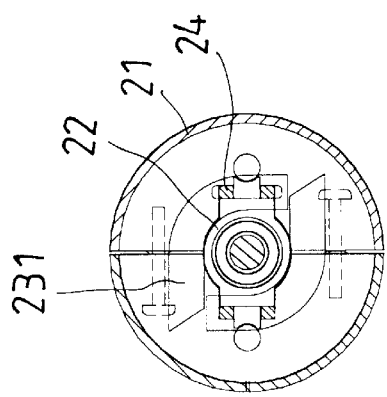
FIG. 4 is a rear cross-sectional view of the rotatable plug of the air purifier of the present invention.
Figure 6:
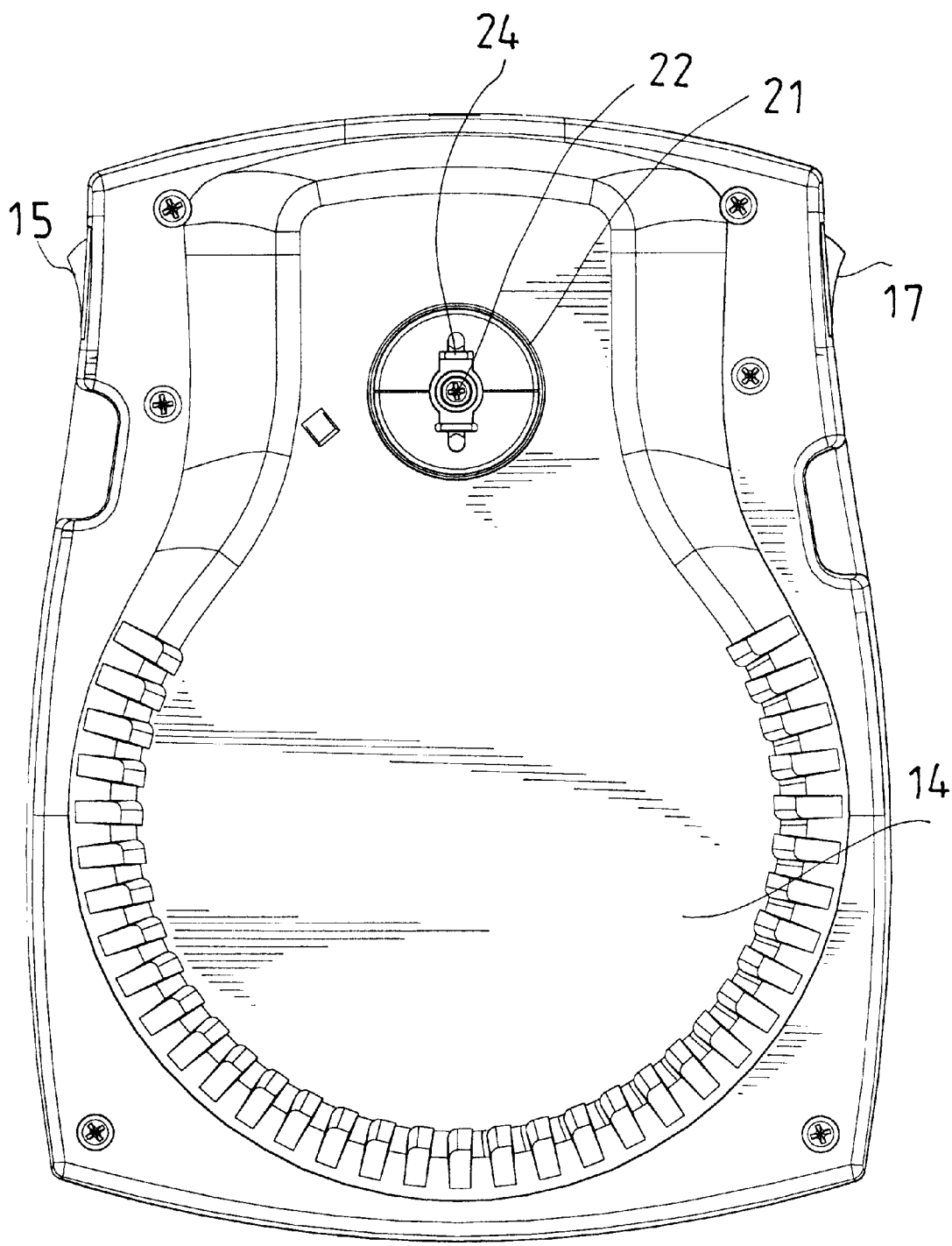
FIG. 6 is a rear cross-sectional view of the air purifier with its rotatable plug in turned condition of the present invention.

In using, referring to FIGS. 3, 4 and 5, turn around the plug casing 21 to let its plug copper strips 24 contact respectively with the L-shaped conductive portions 231 of the conductors 23 in order to alter the direction of the power plug 2 to suit to the different direction and position of a socket, as shown in FIG. 6, thus increasing facility in use. Besides, the power switch 15 to control the motor 141 and the lamp switch 17 to control the lamp 16 are respectively provided so that either of them can be operated separately to carry on air purifying or to use it as a night lamp.

The invention compared with a conventional one has some advantages as can be noted from the above description.

1. The direction of the power plug can be adjusted to suit to different directions or positions of various sockets by turning around the plug casing to let its plug copper strips contact with the L-shaped conductors, increasing facility in use.

2. Aside from being used as an air purifier, this invention can also be used as a night lamp by means of turning on or turn off the lamp switch to control the bulb.

What is claimed is:

1. An air purifier having a rotatable power plug comprising:

a main body member having an arcuate recess formed in an upper wall edge thereof;

a lamp shade having an arcuate sidewall for insertion into said main body recess and an upper wall, said lamp shade being removably received within said recess of said main body member;

a front grille releasably engaging a front surface of said main body member, a filter screen being releasably secured between said front grille and said front surface;

a rear casing having a channel formed therethrough and having a chamber formed in an upper region thereof, said rear casing being pivotally joined to said main body member, said lamp shade covering said chamber, said channel receiving a motorized fan, said rear casing having an upper wall for mating engagement with said upper wall of said lamp shade for providing a continuous closure between said lamp shade and said rear casing;

a lamp bulb received within said chamber of said rear casing;

a lamp switch mounted on said rear casing and being in electrical communication with said lamp bulb;

a power switch mounted on said rear casing and being in electrical communication with said motorized fan; and, a power plug mounted on a rear surface of said rear casing, said power plug having a pair of L-shaped conductive members being in electrical communication with said power switch and said lamp switch, said power plug further having a rotatable shaft member being rotatable with respect to said rear casing and said pair of L-shaped conductive members, a pair of tines for electrically contacting a power source being mounted on said rotatable shaft member, a contact surface of each said tine electrically contacting a respective one of said L-shaped conductive members, whereby electrical contact is maintained through rotation of said rotatable shaft member.

* * * * *